(12) United States Patent
Svendsen et al.

(10) Patent No.: US 9,432,326 B2
(45) Date of Patent: *Aug. 30, 2016

(54) QUESTION SERVER TO FACILITATE COMMUNICATION BETWEEN PARTICIPANTS

(71) Applicant: KOTA ENTERPRISES, LLC, Wilmington, DE (US)

(72) Inventors: Hugh Svendsen, Chapel Hill, NC (US); Scott Curtis, Durham, NC (US)

(73) Assignee: Kota Enterprises, LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/679,243

(22) Filed: Apr. 6, 2015

(65) Prior Publication Data

US 2015/0215262 A1 Jul. 30, 2015

Related U.S. Application Data

(63) Continuation of application No. 12/120,676, filed on May 15, 2008, now Pat. No. 9,002,922.

(51) Int. Cl.

| G06F 15/16 | (2006.01) |
| H04L 12/58 | (2006.01) |
| G06Q 30/02 | (2012.01) |
| H04L 29/08 | (2006.01) |

(52) U.S. Cl.
CPC .............. *H04L 51/32* (2013.01); *G06Q 30/02* (2013.01); *H04L 67/22* (2013.01); *H04L 67/306* (2013.01)

(58) Field of Classification Search
CPC .............................. G06Q 30/02; H04L 67/306

USPC ........................................................ 709/203
See application file for complete search history.

(56) References Cited

U.S. PATENT DOCUMENTS

| 6,038,333 A | 3/2000 | Wang |
| 7,188,139 B1 | 3/2007 | Ayatsuka et al. |
| 7,203,759 B1 | 4/2007 | Ostermann et al. |
| 2002/0115445 A1 | 8/2002 | Myllymaki |

(Continued)

FOREIGN PATENT DOCUMENTS

| CN | 1965350 | 5/2007 |
| CN | 101044504 | 9/2007 |
| CN | 101079936 | 11/2007 |

OTHER PUBLICATIONS

Lieberman et al., "Facemail: Showing Faces of Recipients to Prevent Misdirected Email," Symposium on Usable Privacy and Security (SOUPS) 2007, Jul. 18-20, 2007, 10 pages.

*Primary Examiner* — Bryan Lee

(57) ABSTRACT

Systems and methods are provided for facilitating contact or communication between users or participants. A profile matching process is performed to match a user profile of a first user to a user profile of a second user. A number of questions to ask the second user are automatically selected. In addition, an answer to one or more of the questions may be suggested to the second user. The questions and any suggested answers are then sent to the second user at an associated user device. A reward to be revealed to the second user in response to answering the questions may also be provided. A summary of the answers given by the second user may be provided to the first user. In response, the first user may choose to share his or her full or partial user profile, contact information, or the like with the second user.

24 Claims, 9 Drawing Sheets

(56) References Cited

U.S. PATENT DOCUMENTS

| | | |
|---|---|---|
| 2002/0183112 A1 | 12/2002 | Emmerson et al. |
| 2004/0235460 A1 | 11/2004 | Engstrom et al. |
| 2004/0243671 A9 | 12/2004 | Needham et al. |
| 2005/0054352 A1 | 3/2005 | Karaizman |
| 2005/0191963 A1 | 9/2005 | Hymes |
| 2005/0280502 A1 | 12/2005 | Bell |
| 2006/0074750 A1 | 4/2006 | Clark et al. |
| 2006/0167944 A1 | 7/2006 | Baker |
| 2006/0224680 A1 | 10/2006 | Terayoko |
| 2006/0251338 A1 | 11/2006 | Gokturk et al. |
| 2006/0256959 A1 | 11/2006 | Hymes |
| 2007/0031800 A1 | 2/2007 | Solomon |
| 2008/0032277 A1 | 2/2008 | Maggio et al. |
| 2008/0086534 A1 | 4/2008 | Bardak et al. |
| 2008/0133716 A1 | 6/2008 | Rao et al. |
| 2008/0140650 A1* | 6/2008 | Stackpole ............ G06F 17/3087 |
| 2008/0162649 A1 | 7/2008 | Lee et al. |
| 2008/0201442 A1 | 8/2008 | Ostermann et al. |
| 2008/0263040 A1 | 10/2008 | Talreja |
| 2008/0301557 A1 | 12/2008 | Kotlyar |
| 2008/0307040 A1* | 12/2008 | So ......................... G06Q 10/10 709/203 |
| 2009/0063995 A1 | 3/2009 | Baron et al. |
| 2009/0143079 A1 | 6/2009 | Klassen et al. |
| 2009/0170532 A1 | 7/2009 | Lee et al. |
| 2009/0175499 A1 | 7/2009 | Rosenblatt |
| 2009/0175509 A1 | 7/2009 | Gonion et al. |
| 2009/0271212 A1* | 10/2009 | Savjani ................. G06Q 10/10 705/14.1 |
| 2009/0271484 A1 | 10/2009 | Svendsen et al. |
| 2009/0287763 A1 | 11/2009 | Svendsen et al. |
| 2010/0150410 A1 | 6/2010 | Shah et al. |
| 2012/0072996 A1 | 3/2012 | Svendsen et al. |

* cited by examiner

| Question Text | Type | Point Value | Keywords |
|---|---|---|---|
| What is your Favorite Band? | Calculated at Server | 5 | MEDIA |
| What is the last song you bought? | Calculated at Server | 5 | MEDIA |
| What is the last album you bought? | Calculated at Server | 5 | MEDIA |
| What was the last concert you attended? | Calculated at Server | 5 | MEDIA |
| What was the first concert you attended? | Calculated at Server | 5 | MEDIA |
| What is the last book you read? | Recipient Types In first time - then pulled from server | 10 | MEDIA |
| What is your favorite Movie? | Calculated at Server | 5 | MEDIA |
| Who is your favorite Actor? | Calculated at Server | 5 | MEDIA |
| What School Do you attend? | Pulled From Profile | 5 | SCHOOL, SPORTS |
| What is your favorite Sport? | Recipient Types In first time - then pulled from server | 5 | SPORTS |
| Who is going to win the next Super Bowl? | Multiple Choice | 5 | SPORTS |
| What is your Major? | Recipient Types In first time - then pulled from server | 10 | SCHOOL |
| What is your political affiliation? | Recipient Types In first time - then pulled from server | 10 | POLITICS |
| Who did you vote for in last presidential election? | Multiple Choice | 10 | POLITICS |
| Do you come here often? | Calculated at Server | 10 | DATING |
| How old are you? | Pulled From Profile | 20 | DATING |
| What is your telephone number? | Pulled From Profile | 20 | DATING |
| Do you live near here? | Calculated at Server | 30 | DATING |
| Married / Single? | Pulled From Profile | 30 | DATING |

*FIG. 4*

FIG. 7A
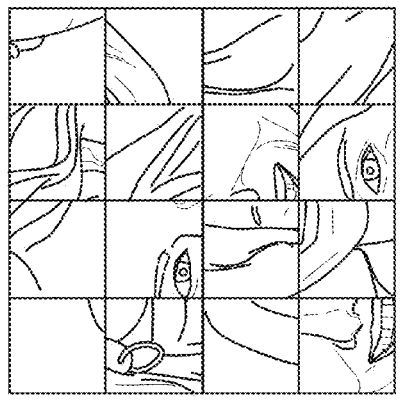
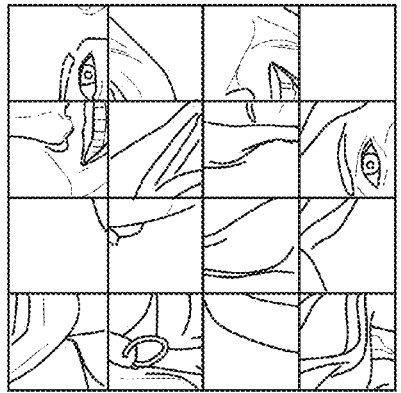
FIG. 7B

QUESTION SERVER TO FACILITATE COMMUNICATION BETWEEN PARTICIPANTS

CROSS REFERENCE TO RELATED APPLICATIONS

This application is a continuation of U.S. patent application Ser. No. 12/120,676, which was filed May 15, 2008, the disclosure of which is hereby incorporated by reference in its entirety.

FIELD OF THE INVENTION

The present invention relates to facilitating contact or communication between users.

BACKGROUND

People often desire to meet new people. Today, a person may meet new people via social networking websites, blogs, chat rooms, and the like. Sometimes these electronic encounters occur on desktop and laptop machines that have rich User Interface (UI) and input capabilities. However, there is an increasing desire to facilitate electronic encounters on resource constrained devices such as mobile telecommunication devices, Personal Digital Assistants (PDAs), and the like. In addition, traditional techniques for meeting new people are primarily manual processes and there is no guarantee that the person and the new people that he or she has met will be compatible. As such, there is a need for a system and method for facilitating communication between compatible persons and, more particularly, a system and method for facilitating electronic introductions where aspects of the introduction are automated thereby making them possible in resource constrained environments.

SUMMARY

The present invention relates to facilitating communication between users or participants. Preferably, communication is facilitated using electronic introductions via resource constrained devices such as mobile phones, Personal Digital Assistants (PDAs), or the like. In general, a profile matching process is performed to match a user profile of a first user to a user profile of a second user. Then, in order to facilitate communication or contact between the first and second users, a number of questions are automatically, or programmatically, selected. In one embodiment, the questions are selected based on common interests of the first and second user. In addition, an answer to one or more of the questions may be suggested to the second user based on information such as, for example, previous answers given by the second user to the same or similar questions, information stored in the user profile of the second user, historical information stored for the second user, or the like. The questions and, if available, the suggested answers are then sent to the second user at an associated user device. After the questions are answered by the second user, a summary of the answers given by the second user may be provided to the first user at an associated user device. In response, the first user may choose to share his or her full or partial user profile, contact information, or the like with the second user. By employing the present invention, user input such as typing is minimized, thereby reducing the burden on participants and maximizing the likelihood of successful matching and communication.

In addition, a reward may be sent to the user device of the second user in association with the questions. The reward may be, for example, an image or picture of the first user, a full or partial profile of the first user, contact information for the first user, or the like. As the questions are answered by the second user, the reward is revealed to the second user.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 4 illustrates a list of exemplary questions including a technique used to suggest answers to the exemplary questions according to one embodiment of the present invention;

FIGS. 7A and 7B illustrate exemplary reward states for a reward revealed to a user in response to the user answering questions according to one embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
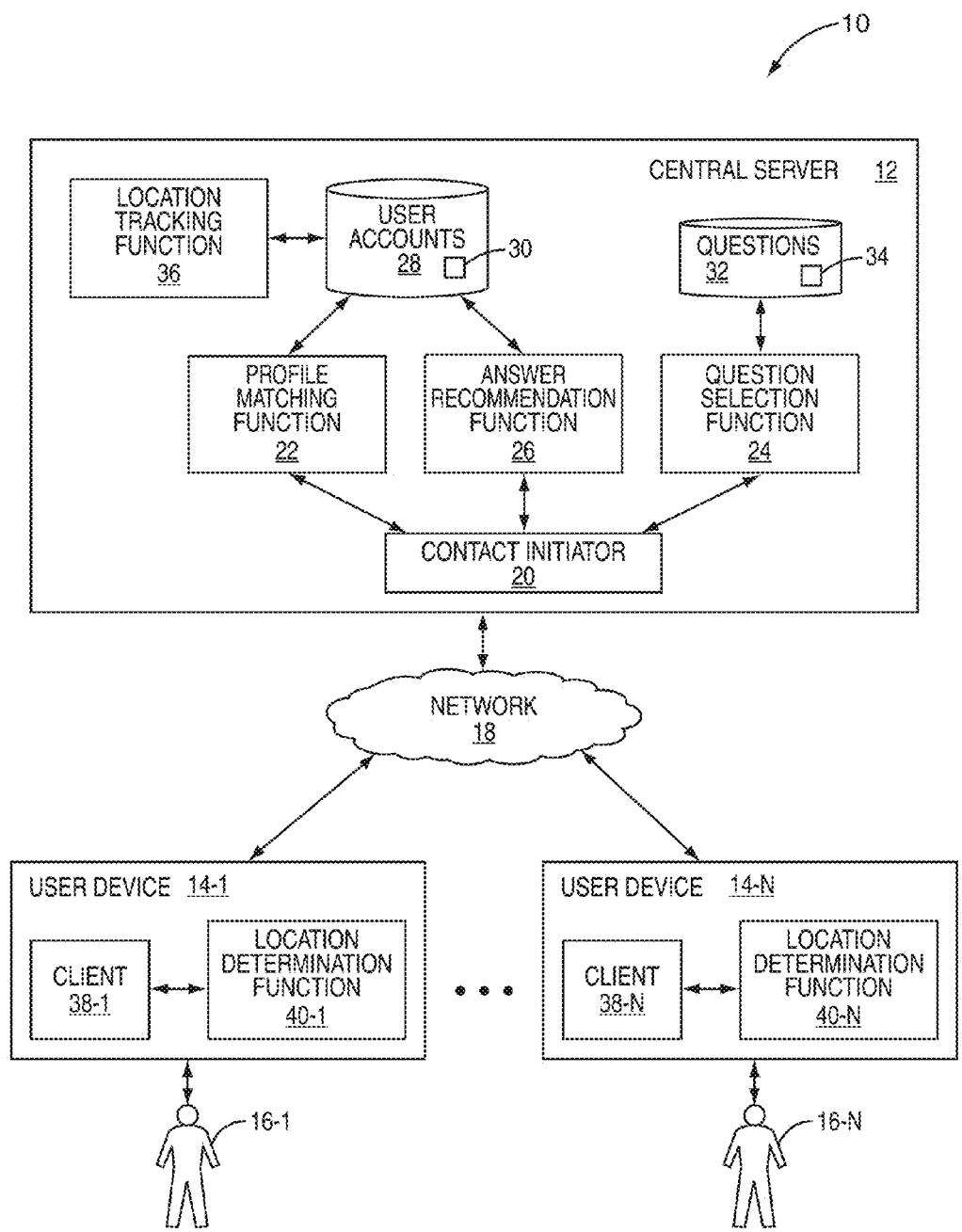
FIG. 1 illustrates a system for facilitating communication between users according to one embodiment of the present invention.

FIG. 1 illustrates an exemplary system 10 for facilitating contact or communication between users according to one embodiment of the present invention. In general, the system 10 includes a central server 12 and a number of user devices 14-1 through 14-N having associated users 16-1 through 16-N. The central server 12 and the user devices 14-1 through 14-N are connected via a network 18. The network 18 may be any type of Wide Area Network (WAN), Local Area Network (LAN), or the like, or any combination thereof, and may include wired components, wireless components, or both wired and wireless components. Note that while the central server 12 is illustrated as a single server, the central server 12 may alternatively be implemented as multiple servers having the functionality of the central server 12 distributed thereon. As another alternative, all or a portion of the functionality of the central server 12 may be distributed among the user devices 14-1 through 14-N.

The central server 12 includes a contact initiator 20, a profile matching function 22, a question selection function 24, and an answer recommendation function 26. The central server 12 also includes a user accounts database 28 including a user account 30 for each of the users 16-1 through 16-N and a questions database 32 including a number of questions 34. The contact initiator 20 may be implemented in software, hardware, or a combination thereof. In general, the contact initiator 20 coordinates operation of the profile matching function 22, the question selection function 24, and the answer recommendation function 26 to facilitate communication between the users 16-1 through 16-N automatically or upon request. For example, in one embodiment, the contact initiator 20 interacts with the profile matching function 22 to automatically identify two users from the users 16-1 through 16-N having matching, or similar, user profiles. The contact initiator 20 may then automatically facilitate communication between the two users or ask one or both of the two users if they wish to allow the contact initiator 20 to facilitate communication between them. As another example, the user 16-1, for example, may send a request to the contact initiator 20 via the user device 14-1 to initiate the process for facilitating communication between the user 16-1 and another user from the users 16-2 through 16-N at the user device 14-1.

The profile matching function 22 may be implemented in software, hardware, or a combination thereof. The profile matching function 22 generally operates to identify users from the users 16-1 through 16-N having matching user profiles. As used herein, two user profiles are matching if they match to at least a desired degree, where the desired degree is preferably defined by one or more matching rules. As discussed below, the user accounts 30 of the users 16-1 through 16-N include user profiles of the users 16-1 through 16-N. In one embodiment, if there is a request from, for example, the user 16-1 to facilitate communication with another user, the profile matching function 22 may operate to perform a matching process to identify a user profile of another user from the users 16-2 through 16-N that matches the user profile of the user 16-1. Note that, in addition to the user profiles, additional criteria such as, for example, location may also be considered. In another embodiment, upon initiation by the contact initiator 20, the profile matching function 22 may perform a profile matching process on the user profiles of the users 16-1 through 16-N to identify one or more pairs of users having matching, or similar, user profiles. Again, note that, in addition to the user profiles, additional criteria such as, for example, location may also be considered.

The question selection function 24 may be implemented in software, hardware, or a combination thereof. Once a pair of users having matching user profiles is identified, the question selection function 24 generally operates to select one or more questions to ask one or both of those users. In one embodiment, each of the questions 34 is tagged or associated with one or more keywords identifying or describing a subject matter of the question 34. The question selection function 24 identifies common interests of the pair of users and then selects one or more of the questions 34 associated with keywords corresponding to the common interests of the pair of users.

The answer recommendation function 26 may also be implemented in software, hardware, or a combination thereof. The answer recommendation function 26 generally operates to recommend, or suggest, answers to questions to be asked of the users 16-1 through 16-N. In one embodiment, the answer recommendation function 26 operates to suggest answers to questions to be sent to, for example, the user 16-1 based on previous answers given by the user 16-1 to the same or similar questions, information stored in the user accounts 30 of the user 16-1 such as the user profile of the user 16-1, or historical or usage information such as, for example, a play history identifying songs or other media items played by the user 16-1, a purchase history identifying songs or other media items recently purchased by the user 16-1, a web browsing history of the user 16-1, a listing of events such as concerts attended by the user 16-1, a listing of movies recently seen by the user 16-1, or the like.

The user accounts database 28 generally operates to store a user account 30 for each of the users 16-1 through 16-N registered with the system 10. Using the user 16-1 as an example, the user account 30 of the user 16-1 generally includes a user profile of the user 16-1. The user profile may include, for example, an image or picture of the user 16-1, contact information for the user 16-1 such as an email address, username, telephone number, or the like. The user profile may also include demographic information such as sex, age, height, weight, or the like.

In addition to the user profile, the user account 30 of the user 16-1 may include information identifying one or more interests of the user 16-1. In one embodiment, the interests may be expressed as one or more keywords associated with subject matter or topics that are of interest to the user 16-1. However, the present invention is not limited thereto. In addition, the user account 30 may include answers provided to previous questions asked of the user 16-1. As discussed below, in one embodiment, the answers provided to previous questions may be used to suggest answers to the same or similar questions to be asked of the user 16-1 in the future.

Still further, the user account 30 may include preferences of the user 16-1. The preferences may include, for example, an indication as to whether the user 16-1 desires for the central server 12 to initiate contact with him for the purpose of facilitating contact between the user 16-1 and another user. Lastly, the user account 30 may also include a current location of the user 16-1 and/or a historical record of the location of the user 16-1, where this location information may be used to assist the profile matching function 22, as discussed below.

The questions database 32 includes a number of questions 34. The questions 34 may be system-defined questions, user-defined questions, or a combination thereof. In addition, in this embodiment, the question database 32 provides a system-wide collection of questions 34 to be used for all of the users 16-1 through 16-N. However, in an alternative embodiment, the questions 34 may be associated with the user accounts 30 of the users 16-1 through 16-N. More specifically, using the user 16-1 as an example, a number of questions 34 may be included within or referenced by the user account 30 of the user 16-1 and utilized when selecting questions 34 to ask another user when contact is being initiated between the user 16-1 and the other user. Again, the questions 34 associated with the user account 30 of the user 16-1 may be system-defined questions, questions defined by the user 16-1, or a combination thereof.

In order to track the locations of the users 16-1 through 16-N, the central server 12 may also includes a location tracking function 36. The location tracking function 36 may be implemented in software, hardware, or a combination thereof. In general, the location tracking function 36 operates to obtain the locations of the users 16-1 through 16-N from the user devices 14-1 through 14-N. In one embodiment, the location tracking function 36 polls the user devices 14-1 through 14-N for their locations periodically or as otherwise desired. In another embodiment, the user devices 14-1 through 14-N periodically provide their locations to the location tracking function 36. As yet another embodiment, the user devices 14-1 through 14-N may provide their initial locations to the location tracking function 36 and thereafter send updates as their locations change. As discussed above, the locations of the users 16-1 through 16-N may be stored in the user accounts 30 of the users 16-1 through 16-N in the user accounts database 28. In addition, the user accounts 30 of the users 16-1 through 16-N may include historical records of the locations of the users 16-1 through 16-N for at least a predetermined amount of time such as, for example, the previous day, the previous week, the previous month, or the like.

The user devices 14-1 through 14-N are preferably mobile devices having network capabilities. For example, the user devices 14-1 through 14-N may each be a mobile telephone such as an Apple® iPhone. However, the present invention is not limited to mobile devices. The user devices 14-1 through 14-N may also be, for example, personal computers or the like. In this embodiment, the user device 14-1 includes a client 38-1 and a location determination function 40-1. Likewise, the user devices 14-2 through 14-N include clients 38-2 through 38-N and location determination functions 40-2 through 40-N, respectively.

The client 38-1 may be implemented in software, hardware, or a combination thereof. In general, the client 38-1 operates to enable initiation of contact between the user 16-1 and other users from the users 16-2 through 16-N. The location determination function 40-1 may be implemented in hardware, software, or a combination thereof. In general, the location determination function 40-1 is any hardware device and/or software application that is capable of determining a location of the user device 14-1, and thus the location of the user 16-1. In one embodiment, the location determination function 40-1 is a Global Positioning System (GPS) receiver or similar Satellite Positioning System (SPS) receiver. In another embodiment, the location determination function 40-1 operates to obtain a location of the user device 14-1 from a base station of a cellular telecommunications network. Note that these two exemplary embodiments of the location determination function 40-1 are not intended to limit the scope of the present invention. Also, while the location determination function 40-1 is illustrated as being part of the user device 14-1, the location determination function 40-1 may alternatively be an external device connected to the user device 14-1 via, for example, a wired connection such as a Universal Serial Bus (USB) or Firewire connection, a local wireless connection such as a Bluetooth® connection, or the like.

Figure 2:
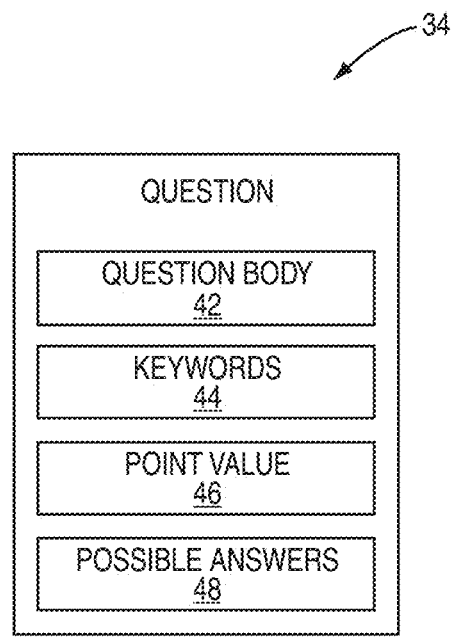
FIG. 2 illustrates an exemplary embodiment of a question in the questions database of FIG. 1.

Before proceeding to discuss the operation of the system 10 of FIG. 1, FIG. 2 illustrates an exemplary embodiment of one the questions 34 of FIG. 1. As illustrated, the question 34 includes a question body 42, one or more keywords 44, a point value 46, and optionally a list of possible answers 48. The question body 42 includes the text forming the question. For example, the question body 42 may provide the text "Who is your favorite music artist or band?". The one or more keywords 44 identify or describe a subject matter of the question 34. The point value 46 is a point value assigned to the question 34. The point value 46 may be a user-assigned value assigned to the question 34 by the user asking the question or a system-assigned value. The question 34 may also include a list of possible answers 48. For example, if the question 34 is a multiple choice question, the list of possible answers 48 includes answers for the multiple choice question. Note that if there is a list of possible answers 48, different point values 46 may be assigned to each of the possible answers rather than assigning a single point value 46 to the question 34. In this manner, as discussed below, a reward revealed in response to a user answering one or more questions 34 may be revealed differently depending on the answers given to the questions 34. Alternatively, one or more desired answers to the question 34 may be defined. Different point values 46 may be assigned to the desired answers as compared to any other answer such that the reward is revealed differently depending on whether the user gives a desired answer as opposed to any other answer.

Figure 3:
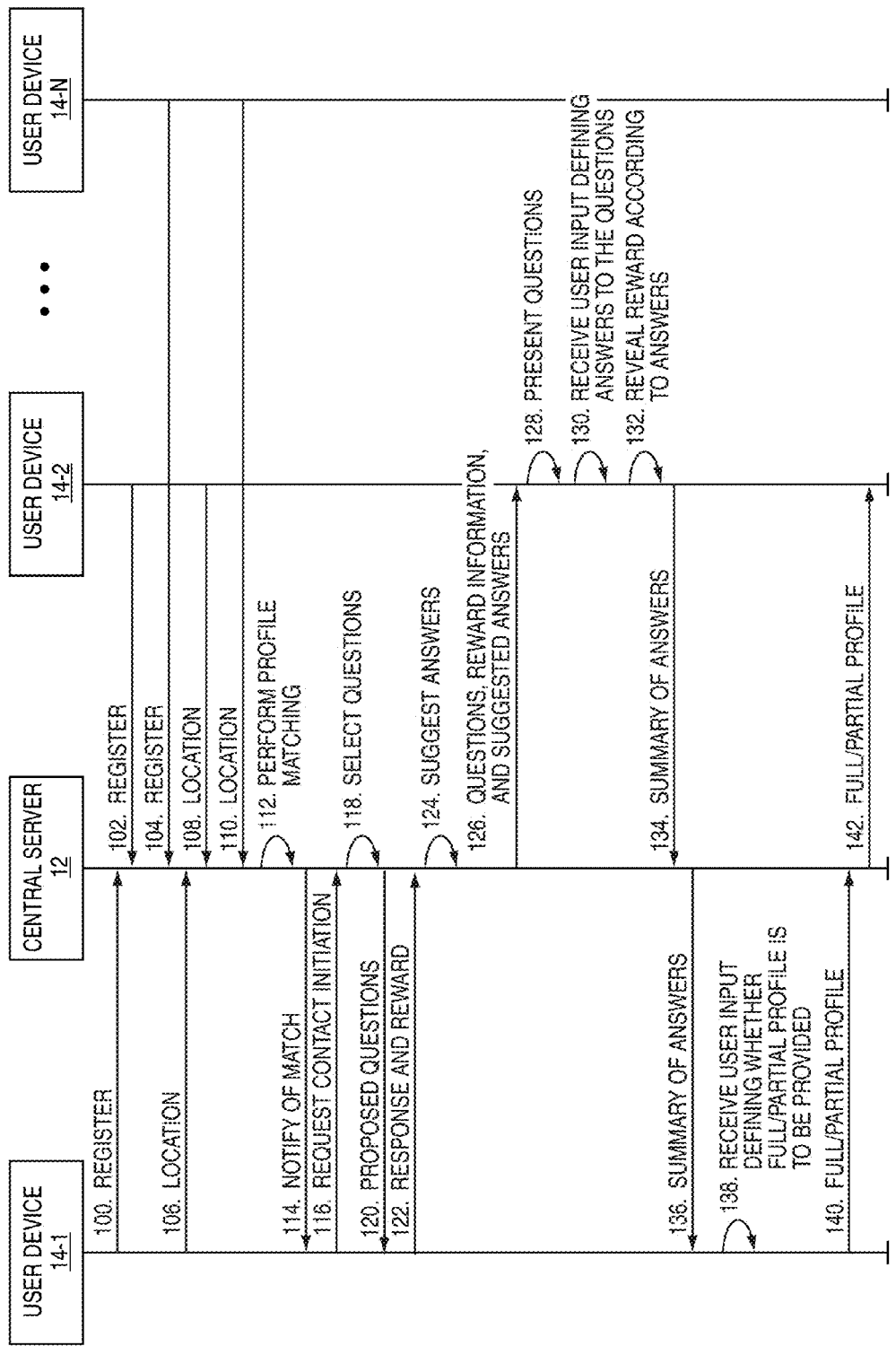
FIG. 3 illustrates the operation of the system of FIG. 1 according to one embodiment of the present invention.

FIG. 3 illustrates the operation of the system 10 of FIG. 1 according to one embodiment of the present invention. First, the user devices 14-1 through 14-N, or alternatively the users 16-1 through 16-N, register with the central server 12 (steps 100-104). During registration, the user accounts 30 of the users 16-1 through 16-N are created. Again, the user accounts 30 of the users 16-1 through 16-N include the user profiles of the users 16-1 through 16-N, respectively. In addition, the user accounts 30 of the users 16-1 through 16-N may include information identifying one or more interests of the users 16-1 through 16-N, answers to questions previously answered by the users 16-1 through 16-N, and preferences of the users 16-1 through 16-N.

Next, the user devices 14-1 through 14-N may provide their locations, or location information, to the central server 12 (steps 106-110). Using the user device 14-1 as an example, in one embodiment, the client 38-1 (FIG. 1) obtains a location of the user device 14-1 from the location determination function 40-1 and sends the location of the user device 14-1 to the location tracking function 36 of the central server 12. The location may be, for example, GPS coordinates, a street address, or the like. As discussed above, the user devices 14-1 through 14-N may send their locations to the central server 12 automatically. For example, the user device 14-1 may send an initial location to the central device 12 during registration and thereafter provide periodic updates to the central server 12 or provide updates to the central server 12 as the location of the user device 14-1 changes. As an alternative, the central server 12 may poll the user devices 14-1 through 14-N for their locations periodically or as otherwise desired. The locations of the user devices 14-1 through 14-N are stored in the user accounts 30 of the corresponding users 16-1 through 16-N. As discussed above, the current locations of the user devices may be stored as the current locations of the users 16-1 through 16-N. In addition, historical records of the locations of the users 16-1 through 16-N may be stored in the corresponding user accounts 30.

At this point, in this example, the profile matching function 22 of the central server 12 performs a profile matching process (step 112). In one embodiment, at the request of, for example, the user 16-1, the client 38-1 sends a request to the contact initiator 20. In response, the contact initiator 20 instructs the profile matching function 22 to perform a profile matching process to identify another user from the users 16-2 through 16-N having a user profile matching the user profile of the user 16-1 to at least a desired degree. In another embodiment, the contact initiator 20 instructs or otherwise configures the profile matching function 22 to perform a profile matching process by which pairs of users from the users 16-1 through 16-N having matching user profiles are identified. As stated above, the user profiles of two users match if the user profiles of those users match to at least a desired degree.

In one embodiment, the profile matching function 22 determines that two user profiles match to at least a desired degree if one or more defined matching rules are satisfied. More specifically, the matching rules may state that in order for two user profiles to match, one or more identified entries in the user profiles must match, one or more identified entries in the user profiles must be within a defined range of one another, or the like. As an example, the matching rules may state that two user profiles match if the user profiles indicate that the two users graduated from the same college, the ages of the two users are within a defined range of one another, the two users live within a defined range from one another such as within the same city or metropolitan area, the two users have one or more hobbies in common, and the two users are of the opposite sex.

In addition, the profile matching function 22 may consider the current locations of the users 16-1 through 16-N and/or the historical locations of the users 16-1 through 16-N. More specifically, in addition to one or matching rules based on the information stored in the user profiles of the users 16-1 through 16-N, the matching rules may also include one or more location-based rules. As a first example, a location-based rule may state that, in order for the user profiles of two users to match, the two users must currently be at the same location, currently be near the same location such as within a defined distance from one another, or the like. As a second example, a location-based rule may state that, in order for the user profiles of two users to match, the second user of the pair must have been located at the current location of the first user of the pair at some time in the past; the second user must have been near the current location of the first user at some time in the past; the second user must have been located at the current location of the first user within some defined amount of time in the past such as, for example, within the last week, within the last month, or the like; or the second user must have been located near the current location of the first user within some defined amount of time in the past.

As a third example, a location-based rule may state that, in order for the user profiles of two users to match, the first user of the pair must have been located at the current location of the second user of the pair at some time in the past, the first user must have been near the current location of the second user at some time in the past, the first user must have been located at the current location of the second user within some defined amount of time in the past, or the first user must have been located near the current location of the second user within some defined amount of time in the past. As a fourth example, a location-based rule may state that, in order for the user profiles of two users to match, a historical location of the first user must be essentially equal to a historical location of the second user, a historical location of the first user must be near a historical location of the second user, a historical location of the first user must be essentially equal to a historical location of the second user within some defined amount of time in the past, or a historical location of the first user must be near a historical location of the second user within some defined amount of time in the past. As a final example, a location-based rule may state that, in order for the user profiles of two users to match, the two users must have frequently visited the same location or locations near one another or frequently visited the same location or locations near one another within a defined amount of time in the past.

The locations and/or historical locations may additionally or alternatively be used prior to the profile matching process in order to reduce the number of user profiles that are considered in the profile matching process. For example, if a profile matching process is to be used to identify a user having a user profile matching that of the user 16-1, the profile matching function 22 may first identify one or more users from the users 16-2 through 16-N that are currently at the same location as the user 16-1, are currently within a defined distance from the user 16-1, were at the location of the user 16-1 within a defined amount of time prior the current time, were within a defined distance from the location of the user 16-1 within a defined amount of time prior to the current time, frequently visit the current location of the user 16-1, frequently visit a location within a defined distance from the current location of the user 16-1, frequently visit a location that is also frequently visited by the user 16-1, frequently visit a location that is within a defined distance from a location frequently visited by the user 16-1, or the like. The profile matching process 22 may then perform a profile matching process to identify a user from the identified subset of the users 16-2 through 16-N having a user profile that matches the user profile of the user 16-1.

In this example, the profile matching process results in identifying the users 16-1 and 16-2 as users having matching user profiles. The central server 12, and more specifically the contact initiator 20, may then send a notification of the match to the user 16-1 at the user device 14-1 (step 114). In response to the notification, the user 16-1 may choose to request or approve contact initiation with the user 16-2, or deny contact initiation with the user 16-2. A corresponding response is then provided to the central server 12 (step 116). The identity of the user 16-2 may or may not be revealed to the user 16-1 at this time. Note that steps 114 and 116 are optional.

Assuming that initiation of contact is desired, the central server 12 then selects one or more questions to ask the user 16-2 on behalf of the user 16-1 (step 118). More specifically, in this embodiment, the contact initiator 20 of the central server 12 instructs the question selection function 24 to select one or more questions to ask the user 16-2 on behalf of the user 16-1. In response, the question selection function 24 selects one or more questions 34 from the questions database 32 to ask the user 16-2. In one embodiment, the question selection function 24 correlates the interests of the users 16-1 and 16-2 provided in the user accounts 30 of the users 16-1 and 16-2 to determine one or more keywords corresponding to the common interests of the users 16-1 and 16-2. The question selection function 24 then selects one or more questions 34 from the questions database 32 having keywords 44 (FIG. 2) corresponding to the common interests of the users 16-1 and 16-2. The number of questions 34 selected may be limited by a maximum number of questions 34 to ask the user 16-2. The maximum number of questions 34 to ask the user 16-2 may be a system-defined limit, a limit defined by the user 16-1, a limit defined by the user 16-2, or the like.

Optionally, the central server 12 may then send the selected, or proposed, questions to the user 16-1 at the user device 14-1 (step 120). The user 16-1 may then be enabled to approve the questions 34 selected by the question selection function 24 of the central server 12, select one or more of the questions 34 selected by the question selection function 24 to ask the user 16-2, modify the questions 34 selected by the question selection function 24 to add or remove questions 34, edit the questions 34 selected by the question selection function 24, or the like. The user device 14-1 then sends a response and a reward to be revealed to the user 16-2 upon answering the questions 34 to the central server 12 (step 122). The response may approve the questions 34 selected by the question selection function 24 of the central server 12, identify a sub-set of the questions 34 selected by the question selection function 24 to ask the user 16-2, include any modifications or edits to the questions 34 selected by the question selection function 24, or the like.

In one embodiment, reward information including the reward, or reward data, is provided to the central server 12 in association with the response of step 122. As discussed below, the reward information includes a number of reward states, reward data, and an algorithm or a reference to an algorithm to be used to reveal the reward data according to the reward states. The user 16-1 may be enabled to select the reward data to be revealed to the user 16-2 upon answering the questions 34 and/or the algorithm to be used to reveal the reward data. Alternatively, rather than providing the reward information, a reference to the reward, or reward data, and/or a reference to the algorithm to be used to reveal the reward may be provided in association with the response of step 122. As another alternative, rather than the reward and/or algorithm for revealing the reward being selected by the user 16-1, the reward and/or the algorithm may be system-defined and non-configurable by the user 16-1. Again, note that the reward, or reward data, may be an image of the user 16-1 such as that included in the user account 30 of the user 16-1, a full or partial version of the user profile of the user 16-1, contact information for the user 16-1, or the like.

In this example, in addition to selecting the questions 34 to ask the user 16-2, the central server 12 may also suggest answers to one or more of the questions 34 for the user 16-2 (step 124). More specifically, the contact initiator 20 may instruct the answer recommendation function 26 to provide suggested, or recommended, answers to the questions 34 to be asked of the user 16-2, if possible. In one embodiment, answers to previous questions answered by the user 16-2 are stored in the user account 30 of the user 16-2. Thus, if any of the questions 34 have previously been answered by the user 16-2, the answer recommendation function 26 may provide the previous answers given by the user 16-2 as suggested answers to the corresponding questions 34. In addition or alternatively, if any of the questions 34 can be answered using information stored in the user account 30 of the user 16-2 and specifically stored in the user profile of the user 16-2, then the answer recommendation function 26 may obtain suggested answers for those questions from the user account 30 of the user 16-2. For example, if one of the questions 34 asks "What school do you attend?", then the answer recommendation function 26 may obtain this information from the user profile of the user 16-2 and suggest an answer accordingly.

Still further, the user account 30 of the user 16-2 may include usage or historical information such as, for example, a play history identifying songs or other media items played by the user 16-2, a purchase history identifying songs or other media items recently purchased by the user 16-2, a web browsing history of the user 16-2, a listing of events such as concerts attended by the user 16-2, a listing of movies recently seen by the user 16-2, or the like. Thus, as an example, if a question 34 asks "Who is your favorite music artist or band?", then the answer recommendation function 26 may analyze a play history of the user 16-2 and/or a historical record of music purchases made by the user 16-2 to suggest an answer to the question 34. A list of exemplary questions 34 and the manner in which the answer recommendation function 26 may suggest answers to those questions is provided in FIG. 4. The list also includes the point value 46 and the one or more keywords 44 for each question 34. Note, however, in this example, the questions 34 do not include possible answers 48.

Returning to FIG. 3, at this point, the contact initiator 20 of the central server 12 sends the selected questions 34, or a modified or edited set thereof, the reward information, and the suggested answers to the user device 14-2 of the user 16-2 (step 126). The client 38-2 of the user device 14-2 then presents the questions 34 to the user 16-2 (step 128). Thereafter, the client 38-2 receives user input from the user 16-2 defining answers to the questions (step 130). As the answers are received, the client 38-2 reveals the reward data from the reward information according to the reward states, as discussed below (step 132). Note that, in one embodiment, the reward states for the reward are defined such that the final reward state after answering all of the questions or answering all of the questions in a manner preferred by the user 16-1 is the completely revealed reward. In another embodiment, the reward states may be defined such that the final reward state is a partial reward, such as a partial user profile or a partially unscrambled image, such that, at most, only a partial reward is revealed to the user 16-2. In this example, a summary of the answers given by the user 16-2 is returned to the central server 12 (step 134). The central server 12 then forwards the summary of the answers given by the user 16-2 to the user device 14-1 of the user 16-1 (step 136).

In this example, upon reviewing the summary of the answers given by the user 16-2, the user 16-1 chooses to reveal his or her full or partial user profile to the user 16-2. As such, the client 38-1 of the user device 14-1 receives user input from the user 16-1 defining whether the full or partial user profile of the user 16-1 is to be provided to the user 16-2 (step 138). The client 38-1 of the user device 14-1 then sends the full or partial user profile of the user 16-1 to the central server 12 (step 140). Alternatively, the client 38-1 may provide instructions to the central server 12 to share the full or partial user profile of the user 16-1 with the user 16-2. The central server 12, and more specifically the contact initiator 20, then sends the full or partial user profile of the user 16-1 to the user device 14-2 of the user 16-2 (step 142). In addition to sharing his or her full or partial user profile, the user 16-1 may compose and send a message to the user 16-2, where the message is delivered to the user 16-2 via the central server 12. Once the user 16-1 has received the full or partial user profile of the user 16-2, the user 16-2 may choose to share his or her full or partial profile with the user 16-1. In addition or alternatively, the user 16-2 may choose to establish communication with the user 16-1 via the central server 12 or traditional communication systems such as email, phone, messaging, or the like based on the contact information of the user 16-1, which is preferably included in the full or partial profile of the user 16-1.

Figure 5:
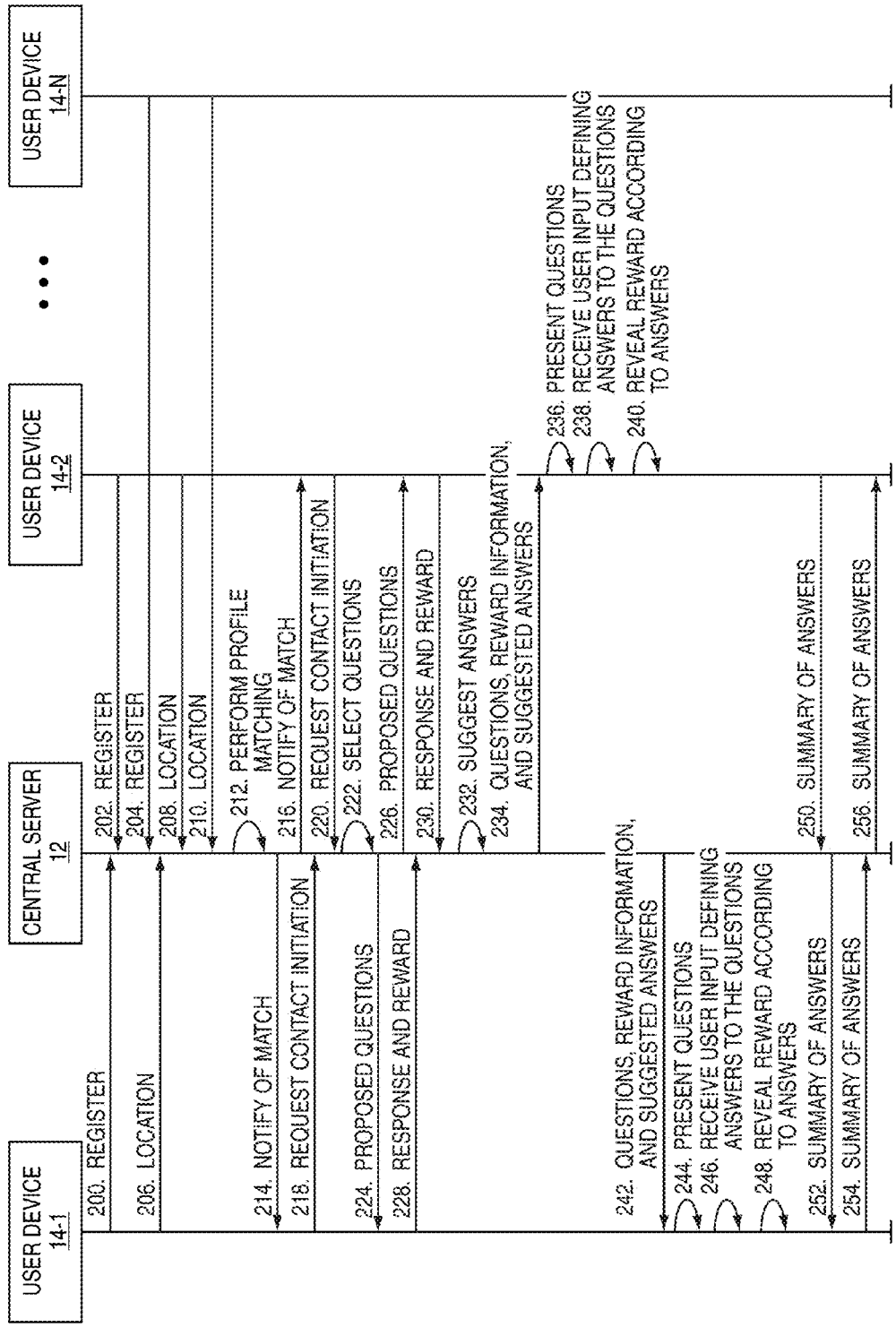
FIG. 5 illustrates the operation of the system of FIG. 1 according to another embodiment of the present invention.

FIG. 5 illustrates the operation of the system 10 of FIG. 1 according to another embodiment of the present invention which is substantially the same as that discussed above with respect to FIG. 3. However, in this embodiment, questions 34 are selected and rewards are revealed for both of the users 16-1 and 16-2 between which contact is initiated. More specifically, first, the user devices 14-1 through 14-N, or alternatively the users 16-1 through 16-N, register with the central server 12 (steps 200-204). During registration, the user accounts 30 of the users 16-1 through 16-N are created. Again, the user accounts 30 of the users 16-1 through 16-N include the user profiles of the users 16-1 through 16-N, respectively. In addition, the user accounts 30 of the users 16-1 through 16-N may include information identifying one or more interests of the users 16-1 through 16-N, answers to questions previously answered by the users 16-1 through 16-N, and preferences of the users 16-1 through 16-N. Next, as discussed above, the user devices 14-1 through 14-N may provide their locations, or location information, to the central server 12 (steps 206-210).

At this point, in this example, the profile matching function 22 of the central server 12 performs a profile matching process, as described above (step 212). In one embodiment, at the request of, for example, the user 16-1, the client 38-1 sends a request to the contact initiator 20. In response, the contact initiator 20 instructs the profile matching function 22 to perform a profile matching process to identify another user from the users 16-2 through 16-N having a user profile matching the user profile of the user 16-1. In another embodiment, the contact initiator 20 instructs or otherwise configures the profile matching function 22 to perform a profile matching process by which pairs of users from the users 16-1 through 16-N having matching user profiles are identified. As stated above, the user profiles of two users match if the user profiles of those users match to at least a desired degree.

In this example, the profile matching process results in identifying the users 16-1 and 16-2 as users having matching user profiles. The central server 12, and more specifically the contact initiator 20, may then send notifications of the match to the users 16-1 and 16-2 at the user devices 14-1 and 14-2, respectively (steps 214 and 216). In response to the notification, the user 16-1 may choose to request or approve contact initiation with the user 16-2, or deny contact initiation with the user 16-2, and a corresponding response is provided to the central server 12 (step 218). The identity of the user 16-2 may or may not be revealed to the user 16-1 at this time. Likewise, in response to the notification, the user 16-2 may choose to request or approve contact initiation with the user 16-1, or deny contact initiation with the user 16-1, and a corresponding response is provided to the central server 12 (step 220). Note that steps 214 through 220 are optional.

Assuming that initiation of contact is desired, the central server 12 then selects one or more questions to ask the user 16-2 on behalf of the user 16-1 as well as one or more questions to ask the user 16-1 on behalf of the user 16-2 (step 222). In one embodiment, the same questions are selected for both the users 16-1 and 16-2. More specifically, the contact initiator 20 of the central server 12 may instruct the question selection function 24 to select one or more questions 34 to ask the users 16-1 and 16-2. In response, the question selection function 24 selects one or more questions 34 from the questions database 32 to ask the users 16-1 and 16-2. In one embodiment, the question selection function 24 correlates the interests of the users 16-1 and 16-2 to determine one or more keywords corresponding the common interests of the users 16-1 and 16-2. The question selection function 24 then selects one or more questions 34 from the questions database 32 having corresponding keywords 44 (FIG. 2). The number of questions 34 selected may be limited by a maximum number of questions 34 to ask the users 16-1 and 16-2. The maximum number of questions 34 to ask the users 16-1 and 16-2 may be a system-defined limit, a limit defined by the users 16-1 and 16-2, or the like.

In another embodiment, different questions 34 may be selected for each of the users 16-1 and 16-2. More specifically, in this embodiment, the contact initiator 20 of the central server 12 may first instruct the question selection function 24 to select one or more questions to ask the user 16-2 on behalf of the user 16-1 as well as one or more questions to ask the user 16-1 on behalf of the user 16-2. In response, the question selection function 24 selects one or more questions 34 from the questions database 32 to ask the user 16-2 as well as one or more questions to ask the user 16-1. In one embodiment, the question selection function 24 correlates the interests of the users 16-1 and 16-2 to determine one or more keywords corresponding the common interests of the users 16-1 and 16-2. The question selection function 24 then selects one or more questions 34 from the questions database 32 having corresponding keywords 44 as questions 34 to ask the user 16-1. Likewise, the question selection function 24 selects one or more questions 34 from the questions database 32 having corresponding keywords 44 as questions 34 to ask the user 16-2. There may or may not be some overlap in the questions 34 selected for the users 16-1 and 16-2. For example, in this embodiment, if both users 16-1 and 16-2 are to be asked three questions, the users 16-1 and 16-2 are not asked the same three questions 34. However, one or two of the questions 34 but not all three questions 34 may be the same for both of the users 16-1 and 16-2. Again, the number of questions 34 selected for each of the users 16-1 and 16-2 may be limited by a maximum number of questions 34 to ask the users 16-1 and 16-2. The maximum number of questions 34 to ask each of the users 16-1 and 16-2 may be a system-defined limit, a limit defined by the user 16-1, a limit defined by the user 16-2, or the like.

Optionally, the central server 12 may then send the selected, or proposed, questions 34 to ask the user 16-2 to the user 16-1 at the user device 14-1 (step 224). Likewise, the central server 12 may send the selected, or proposed, questions 34 to ask the user 16-1 to the user 16-2 at the user device 14-2 (step 226). The user 16-1 may then be enabled to approve the questions 34 selected by the question selection function 24 to ask the user 16-2, select one or more of the questions 34 selected by the question selection function 24 to ask the user 16-2, modify or edit the questions 34 selected by the question selection function 24 to ask the user 16-2, or the like. The user device 14-1 then sends a response and a reward to be revealed to the user 16-2 upon answering the questions 34 (step 228). The response may approve the questions 34 selected by the question selection function 24 to ask the user 16-2, identify a sub-set of the questions 34 selected by the question selection function 24 to ask the user 16-2, include any modifications or edits to the questions 34 selected by the question selection function 24 to ask the user 16-2, or the like.

In one embodiment, reward information including the reward, or reward data, is provided to the central server 12 in association with the response of step 228. As discussed below, the reward information includes a number of reward states, reward data, and an algorithm or a reference to an algorithm to be used to reveal the reward data according to the reward states. The user 16-1 may be enabled to select the reward data to be revealed to the user 16-2 upon answering the questions 34 and/or the algorithm to be used to reveal the reward data. Alternatively, rather than providing the reward information, a reference to the reward, or reward data, and/or a reference to the algorithm to be used to reveal the reward may be provided in association with the response of step 228. As another alternative, rather than the reward and/or algorithm for revealing the reward being selected by the user 16-1, the reward and/or the algorithm may be system-defined and non-configurable by the user 16-1. Again, note that the reward, or reward data, may be an image of the user 16-1 such as that included in the user account 30 of the user 16-1, a full or partial version of the user profile of the user 16-1, contact information for the user 16-1, or the like.

Like the user 16-1, the user 16-2 may also be enabled to approve the questions 34 selected by the question selection function 24 to ask the user 16-1, select one or more of the questions 34 selected by the question selection function 24 to ask the user 16-1, modify or edit the questions 34 selected by the question selection function 24 to ask the user 16-1, or the like. The user device 14-2 then sends a response and a reward to be revealed to the user 16-1 upon answering the questions 34 (step 230). The response may approve the questions 34 selected by the question selection function 24 to ask the user 16-1, identify a sub-set of the questions 34 selected by the question selection function 24 to ask the user 16-1, include any modifications or edits to the questions 34 selected by the question selection function 24 to ask the user 16-1, or the like.

Again, in one embodiment, reward information including the reward, or reward data, is provided to the central server 12 in association with the response of step 230. As discussed below, the reward information includes a number of reward states, reward data, and an algorithm or a reference to an algorithm to be used to reveal the reward data according to the reward states. The user 16-2 may be enabled to select the reward data to be revealed to the user 16-1 upon answering the questions 34 and/or the algorithm to be used to reveal the reward data. Alternatively, rather than providing the reward information, a reference to the reward, or reward data, and/or a reference to the algorithm to be used to reveal the reward may be provided in association with the response of step 230. As another alternative, rather than the reward and/or algorithm for revealing the reward being selected by the user 16-2, the reward and/or the algorithm may be system-defined and non-configurable by the user 16-2. Again, note that the reward, or reward data, may be an image picture of the user 16-2 such as that included in the user account 30 of the user 16-2, a full or partial version of the user profile of the user 16-2, contact information for the user 16-2, or the like.

In this example, in addition to selecting the questions 34 to ask the users 16-1 and 16-2, the central server 12 may also suggest answers to one or more of the questions 34 for the users 16-1 and 16-2 (step 232). More specifically, the contact initiator 20 may instruct the answer recommendation function 26 to provide suggested, or recommended, answers to the questions 34 to be asked of the users 16-1 and 16-2, if possible. In one embodiment, answers to previous questions answered by the users 16-1 and 16-2 are stored in the user accounts 30 of the users 16-1 and 16-2. Thus, if any of the questions 34 that the user 16-1 is to be asked have previously been answered by the user 16-1, the answer recommendation function 26 may provide the previous answers given by the user 16-1 as suggested answers to the corresponding questions 34. Likewise, if any of the questions 34 that the user 16-2 is to be asked have previously been answered by the user 16-2, the answer recommendation function 26 may provide the previous answers given by the user 16-2 as suggested answers to the corresponding questions 34.

In addition or alternatively, if any of the questions 34 can be answered using information stored in the user accounts 30 of the users 16-1 and 16-2 and specifically stored in the user profiles of the users 16-1 and 16-2, then the answer recommendation function 26 may obtain suggested answers for those questions 34 from the user accounts 30 of the users 16-1 and 16-2. For example, if one of the questions 34 for the user 16-1 asks "What school do you attend?", then the answer recommendation function 26 may obtain this information from the user profile of the user 16-1 and suggest an answer accordingly. Still further, the user accounts 30 of the users 16-1 and 16-2 may include usage or historical information such as, for example, play histories identifying songs or other media items played by the users 16-1 and 16-2, purchase histories identifying songs or other media items recently purchased by the users 16-1 and 16-2, web browsing histories of the users 16-1 and 16-2, listings of events such as concerts attended by the users 16-1 and 16-2, listings of movies recently seen by the users 16-1 and 16-2, or the like. Thus, as an example, if a question 34 for the user 16-1 asks "Who is your favorite music artist or band?", then the answer recommendation function 26 may analyze a play history of the user 16-1 and/or a historical record of music purchases made by the user 16-1 to suggest an answer to the question 34.

At this point, the contact initiator 20 of the central server 12 sends the selected questions 34 to ask the user 16-2, or a modified or edited set thereof, the reward information for the user 16-2, and the suggested answers for the user 16-2 to the user device 14-2 of the user 16-2 (step 234). In response, the client 38-2 of the user device 14-2 presents the questions 34 to the user 16-2 (step 236). Thereafter, the client 38-2 receives user input from the user 16-2 defining answers to the questions (step 238). As the answers are received, the client 38-2 reveals the reward data from the reward information according to the reward states, as discussed below (step 240).

Likewise, the contact initiator 20 of the central server 12 sends the selected questions 34 to ask the user 16-1, or a modified or edited set thereof, the reward information for the user 16-1, and the suggested answers for the user 16-1 to the user device 14-1 of the user 16-1 (step 242). In response, the client 38-1 of the user device 14-1 presents the questions 34 to the user 16-1 (step 244). Thereafter, the client 38-1 receives user input from the user 16-1 defining answers to the questions 34 (step 246). As the answers are received, the client 38-1 reveals the reward data from the reward information according to the reward states, as discussed below (step 248).

In this example, a summary of the answers given by the user 16-2 is returned to the central server 12 (step 250). The central server 12 then forwards the summary of the answers given by the user 16-2 to the user device 14-1 of the user 16-1 (step 252). Likewise, a summary of the answers given by the user 16-1 is returned to the central server 12 (step 254). The central server 12 then forwards the summary of the answers given by the user 16-1 to the user device 14-2 of the user 16-2 (step 256).

While not shown, as discussed above, upon reviewing the summary of the answers given by the user 16-2, the user 16-1 may choose to reveal his or her full or partial user profile to the user 16-2. Likewise, upon reviewing the summary of the answers given by the user 16-1, the user 16-2 may choose to reveal his or her full or partial user profile to the user 16-1. Once the users share their full or partial user profiles, the users 16-1 and 16-2 may initiate communication using, for example, email, telephone, messaging, or the like based on contact information contained in the full or partial user profiles.

Figure 6:
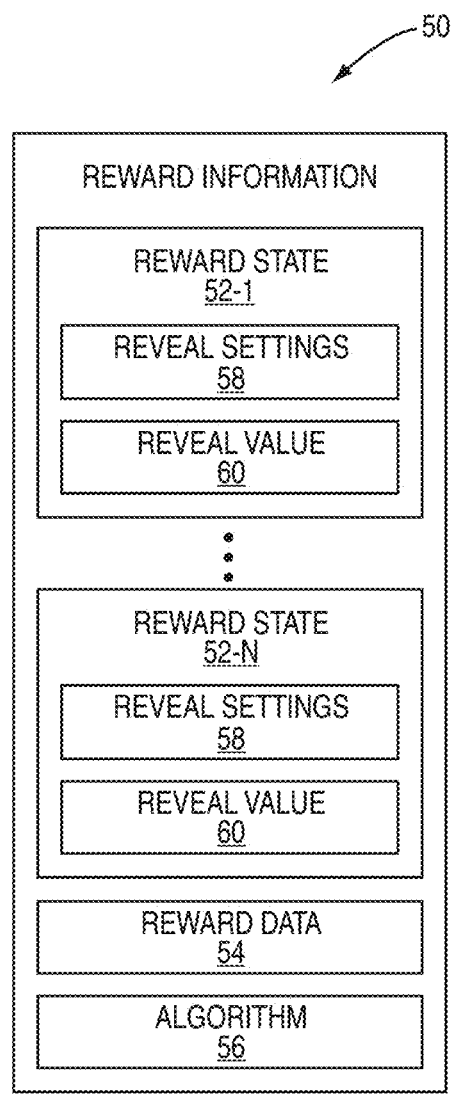
FIG. 6 illustrates an exemplary embodiment of reward information providing a reward to be revealed to a user in response to answering questions according to one embodiment of the present invention.
Figure 8:
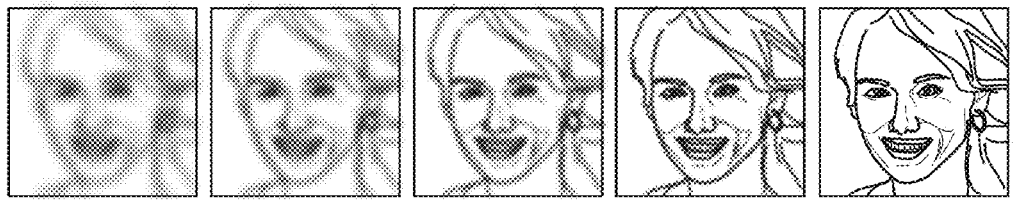
FIGS. 8-12 illustrate reward states for additional exemplary distortion algorithms.
Figure 9:
Figure 10:
Figure 11:
Figure 12:

FIG. 6 illustrates reward information 50 that may be used when revealing a reward in response to answering questions according to one embodiment of the present invention. The reward information 50 includes a number of reward states 52-1 through 52-M, reward data 54, and an algorithm 56 for revealing the reward data 54 according to the reward states 52-1 through 52-N. The reward states 52-1 through 52-M each includes reveal settings 58 and a reveal value 60. The reveal settings 58 and the reveal value 60 are inputs to the algorithm 56 to control the revealing of the reward data 54. When revealing the reward data 54 in response to the answering of questions, a reward state is selected from the reward states 52-1 through 52-M based on the point value 46 (FIG. 2) or an accumulated point value for the questions 34 answered by the user.

Using the user 16-2 as an example, in one embodiment, the number of reward states M is equal to a total number of points that may be accumulated by the user 16-2 answering the questions 34 selected for the user 16-2. In one embodiment, the total number of points that may be accumulated is the sum of the point values 46 of the questions 34 selected to ask the user 16-2. The reveal values 60 of the reward states 52-1 through 52-M correspond to potential accumulated point values. For example, if the total number of points that may be accumulated by the user 16-2 by answering the questions 34 is ten (10), then there may be eleven (11) reward states 52-1 through 52-11 with reveal values 60 of zero (0) through (10), respectively. The reveal settings 58 of the reward states 52-1 through 52-11 are inputs to the algorithm 56 and control the revealing of the reward data 54. Thus, if the reward data 54 is an image of the user 16-1, the algorithm 56 may be an algorithm for distorting the image. The reveal settings 58 for each reward state 52-1 through 52-11 control the amount of distortion, with the reward state 52-1 causing a maximum distortion, the reward state 52-11 causing a minimum or no distortion, and the reward states 52-2 through 52-10 causing intermediate levels of distortion. Thus, before any questions 34 are answered by the user 16-2, the reward is in the reward state 52-1 such that the image, or reward data 54, is presented with a maximum amount of distortion. After the user 16-2 answers the first question 34, the point value 46 for the first question 34 is used to select one of the reward states 52-1 through 52-11 having a reveal value 60 corresponding to the point value 46 of the first question 34. After the user 16-2 answers the second question 34, the sum of the point values 46 of the first and second questions 34 is used to select one of the reward states 52-1 through 52-11 having a reveal value 60 corresponding to the sum of the point values 46 of the first and second questions 34. The process continues to reveal the reward data 54 as the user 16-2 answers the remaining questions 34.

FIG. 7A illustrates the reveal settings 58 in an embodiment where there are three reward states 52-1 through 52-3, the reward data 54 is an image, and the algorithm 56 is an algorithm for scrambling or distorting the image. As shown, the image is divided into a number of blocks numbered one (1) through sixteen (16). The reveal settings 58 provide the arrangement of the blocks of the image. The corresponding versions of the image, or reward data 54, provided by the algorithm 56 for each of the reward states 52-1 through 52-3 are illustrated in FIG. 7B. As shown, in the reward state 52-1, the image is severely distorted. In the reward state 52-2, the image is less distorted. Lastly, in the reward state 52-3, the image is non-distorted or has no distortion. FIGS. 8 through 12 illustrate exemplary alternative algorithms for distorting the image of FIG. 7B. Note that the examples given above with respect to FIGS. 7A, 7B, and 8-12 are exemplary and not intended to limit the scope of the present invention.

Figures 13, 14:
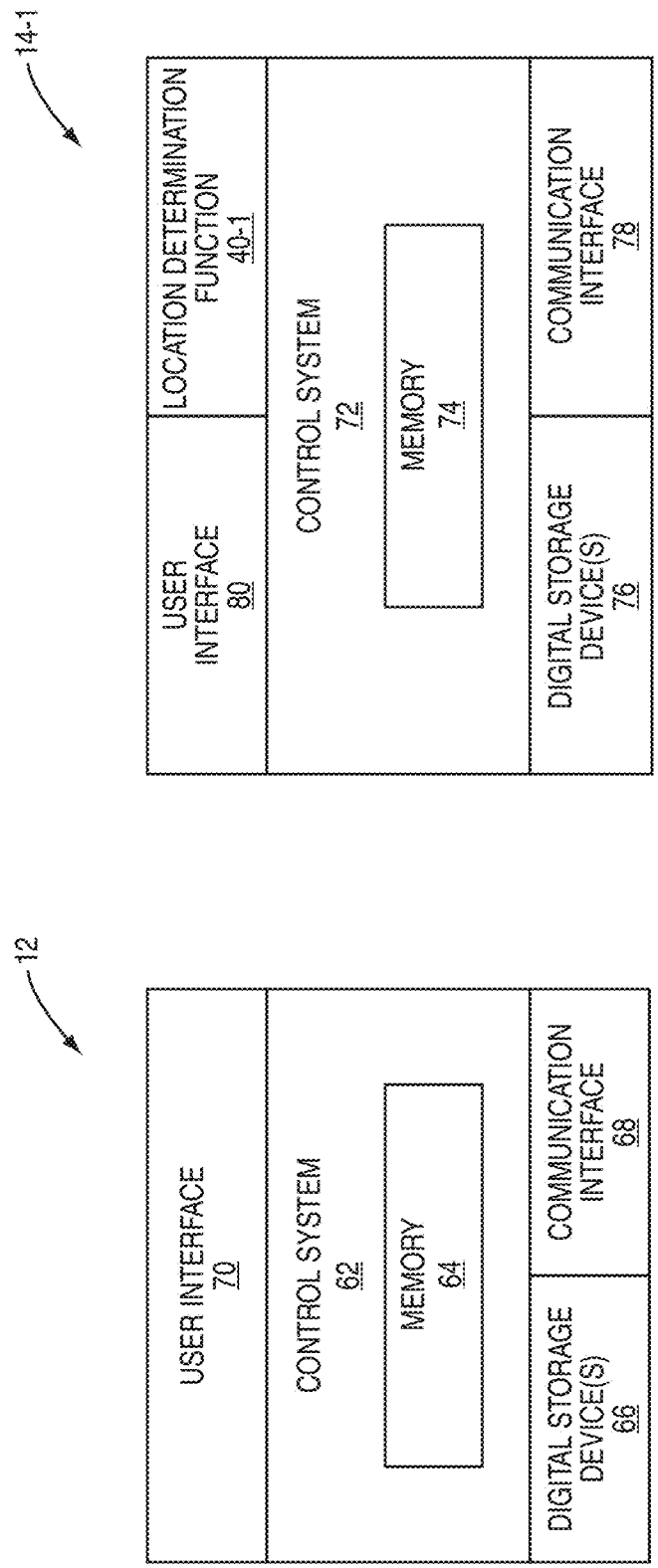
FIG. 13 is a block diagram of the central server of FIG. 1 according to one embodiment of the present invention.
FIG. 14 is a block diagram of one of the user devices of FIG. 1 according to one embodiment of the present invention.

FIG. 13 is a block diagram of the central server 12 of FIG. 1 according to one embodiment of the present invention. In general, the central server 12 includes a control system 62 having associated memory 64. In one embodiment, contact initiator 20, the profile matching function 22, the question selection function 24, the answer recommendation function 26, and the location tracking function 36 are implemented in software and stored in the memory 64. However, the present invention is not limited thereto. The contact initiator 20, the profile matching function 22, the question selection function 24, the answer recommendation function 26, and the location tracking function 36 may each be implemented in software, hardware, or a combination thereof. The central server 12 may also include one or more digital storage devices 66 such as, for example, one or more hard disk drives. The one or more digital storage devices 66 may be used to store the user accounts database 28 and the questions database 32. The central server 12 also includes a communication interface 68 that communicatively couples the central server 12 to the network 18 (FIG. 1). Lastly, the central server 12 may include a user interface 70, which may include components such as a display, one or more user input devices, or the like.

FIG. 14 is a block diagram of the user device 14-1 according to one embodiment of the present invention. This discussion is equally applicable to the other user devices 14-2 through 14-N. In general, the user device 14-1 includes a control system 72 having associated memory 74. In one embodiment, the client 38-1 (FIG. 1) is implemented in software and stored in the memory 74. However, the present invention is not limited thereto. The client 38-1 may be implemented in software, hardware, or a combination thereof. The user device 14-1 also includes the location determination function 40-1. The user device 14-1 may also include one or more digital storage devices 76 such as, for example, one or more hard disk drives. The user device 14-1 also includes a communication interface 78 communicatively coupling the user device 14-1 to the network 18 (FIG. 1). Lastly, the user device 14-1 may include a user interface 80, which may include components such as a display, one or more user input devices, or the like.

Those skilled in the art will recognize improvements and modifications to the preferred embodiments of the present invention. All such improvements and modifications are considered within the scope of the concepts disclosed herein and the claims that follow.

What is claimed is:

1. A system comprising:
    a communication interface communicatively coupling the system to a plurality of user devices of a plurality of users via a network;
    at least one hardware processor; and
    memory containing software executable by the at least one processor, whereby the system is operative to:
        receive a request from a first user to initiate contact with another user;
        in response to receiving the request:
            determine whether at least one location-based rule that defines a location-based relationship between the first user and a second user is satisfied, the second user being one of the plurality of users;
            if the at least one location-based rule that defines a location-based relationship between the first user and the second user is satisfied, perform a profile matching process to a user profile of the second user to determine if the user profile of the second user matches the user profile of the first user to a defined degree;
if the user profile of the second user matches the user profile of the first user to a defined degree:
notify the first user at a user device associated with the first user that another user having a matching user profile has been identified;
notify the second user at the user device associated with the second user that another user having a matching user profile has been identified;
receive authorization from both the first and second users; and
in response to receiving the authorization from the first and second users:
automatically and preferentially select at least one question to ask the second user on behalf of the first user; and
provide the at least one question to the second user at a user device of the plurality of user devices associated with the second user.

2. The system of claim 1 wherein the system is further operative to provide a reward to the user device associated with the second user such that the reward is revealed to the second user in response to the second user answering the at least one question.

3. The system of claim 2 wherein to provide the reward, the system is operative to provide reward information comprising reward data and at least two reward states such that the reward data is revealed to the second user in response to answering the at least one question according to the at least two reward states.

4. The system of claim 2 wherein the reward comprises at least one of a group consisting of:
an image of the first user, a full profile of the first user, a partial profile of the first user, and contact information for the first user.

5. The system of claim 1 wherein to automatically and preferentially select via the computing device the at least one question to ask the second user, the system is operative to automatically and preferentially select via the computing device the at least one question from a plurality of questions based on common interests of the first and second users.

6. The system of claim 1 wherein to automatically and preferentially select via the computing device the at least one question, the system is operative to:
correlate interests of the first user and interests of the second user to determine at least one common interest of the first user and the second user; and
select the at least one question from a plurality of questions based on the at least one common interest of the first user and the second user.

7. The system of claim 1 wherein the system is further operative to:
obtain a suggested answer to a question of the at least one question for the second user; and
provide the suggested answer to the question to the second user at the user device associated with the second user.

8. The system of claim 7 wherein to obtain the suggested answer to the question, the system is operative to obtain the suggested answer to the question from the user profile of the second user.

9. The system of claim 7 wherein to obtain the suggested answer to the question, the system is operative to obtain the suggested answer to the question based on historical usage information for the second user.

10. The system of claim 1 wherein the system is operative to return a summary of answers given to the at least one question by the second user to the first user at a user device associated with the first user.

11. The system of claim 1 wherein the profile matching process comprises determining if at least one rule identifying entries in the user profiles of the first and second users that must be essentially equal before the user profiles of the first and second users are determined to be matching is satisfied.

12. The system of claim 1 wherein the profile matching process comprises determining if at least one rule identifying entries in the user profiles of the first and second users that must be within a desired range of one another before the user profiles of the first and second users are determined to be matching is satisfied.

13. The system of claim 1 wherein the location-based relationship between the first user and the second user is at least one of a current location of the first user being essentially equal to a current location of the second user and the current location of the second user being within a defined distance from the current location of the first user.

14. The system of claim 1 wherein the location-based relationship between the first user and the second user is that at least one of a historical location of the first user is essentially equal to a current location of the second user, a historical location of the first user is essentially equal to a current location of the second user within a defined amount of time prior to a current time, a historical location of the second user is within a defined distance from a historical location of the first user, and a historical location of the second user is within a defined distance from a historical location of the first user within a defined amount of time prior to a current time.

15. The system of claim 1 wherein the location-based relationship between the first user and the second user is that at least one of:
the first user frequently visits a location that is essentially equal to a location that is frequently visited by the second user and the first user frequently visits a location that is within a defined distance from a location frequently visited by the second user.

16. The system of claim 1 wherein the location-based relationship between the first user and the second user is that at least one of:
a current location of the second user is essentially equal to a historical location of the first user, a current location of the second user is essentially equal to a location at which the first user was located within a defined amount of time prior to a current time, a current location of the second user is within a defined distance of a historical location of the first user, and a current location of the second user is within a defined distance from a location at which the first user was located within a defined amount of time prior to a current time.

17. The system of claim 1 wherein the location-based relationship between the first user and the second user is that at least one of:
a current location of the first user is essentially equal to a historical location of the second user, a current location of the first user is essentially equal to a location at which the second user was located within a defined amount of time prior to a current time, a current location of the first user is within a defined distance of a historical location of the second user, and a current location of the first user is within a defined distance from a location at which the second user was located within a defined amount of time prior to a current time.

18. The system of claim 1 wherein the system is operative to obtain approval of the at least one question from the first user prior to providing the at least one question to the second user.

19. The system of claim 1 wherein the system is operative to enable the first user to perform an action selected from a group consisting of:
add a question to the at least one question prior to providing the at least one question to the second user and remove a question from the at least one question prior to providing the at least one question to the second user.

20. The system of claim 1 further comprising enabling the first user to edit a question from the at least one question prior to providing the at least one question to the second user.

21. The system of claim 1 wherein the system is operative to:
automatically and preferentially select via the computing device at least one question to ask the first user on behalf of the second user; and
provide the at least one question selected for the first user to the first user at a user device associated with the first user.

22. The system of claim 21 wherein the system is operative to provide a reward to the user device associated with the first user such that the reward is revealed to the first user in response to the first user answering the at least one question selected for the first user.

23. A non-transitory computer-readable medium storing a computer program, executable by at least one processor, the computer program comprising executable instructions for:
receiving a request from a first user to initiate contact with another user;
in response to receiving the request:
determining whether at least one location-based rule that defines a location-based relationship between the first user and a second user is satisfied, the second user being one of the plurality of users;
if the at least one location-based rule that defines a location-based relationship between the first user and the second user is satisfied, performing a profile matching process to a user profile of the second user to determine if the user profile of the second user matches the user profile of the first user to a defined degree;
if the user profile of the second user matches the user profile of the first user to a defined degree:
notifying the first user at a user device associated with the first user that another user having a matching user profile has been identified;
notifying the second user at the user device associated with the second user that another user having a matching user profile has been identified;
receiving authorization from both the first and second users; and
in response to receiving the authorization from the first and second users:
automatically and preferentially selecting at least one question to ask the second user on behalf of the first user; and
providing the at least one question to the second user at a user device of the plurality of user devices associated with the second user.

24. A method of operating a device comprising:
receiving a request from a first user to initiate contact with another user;
in response to receiving the request:
determining whether at least one location-based rule that defines a location-based relationship between the first user and a second user is satisfied, the second user being one of the plurality of users;
if the at least one location-based rule that defines a location-based relationship between the first user and the second user is satisfied, performing a profile matching process to a user profile of a second user to determine if the user profile of the second user matches the user profile of the first user to a defined degree;
if the user profile of the second user matches the user profile of the first user to a defined degree:
notifying the first user at a user device associated with the first user that another user having a matching user profile has been identified;
notifying the second user at the user device associated with the second user that another user having a matching user profile has been identified;
receiving authorization from both the first and second users; and
in response to receiving the authorization from the first and second users:
automatically and preferentially selecting at least one question to ask the second user on behalf of the first user; and
providing the at least one question to the second user at a user device of the plurality of user devices associated with the second user.

* * * * *